(12) United States Patent
Tu et al.

(10) Patent No.: US 10,536,017 B2
(45) Date of Patent: Jan. 14, 2020

(54) MANAGING CHARGE OF A BATTERY IN A CLIMATE CONTROL DEVICE TO PROLONG BATTERY LIFE

(71) Applicant: Emerson Electric Co., St. Louis, MO (US)

(72) Inventors: Lihui Tu, Xi'an (CN); Edward B. Evans, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 197 days.

(21) Appl. No.: 14/594,323

(22) Filed: Jan. 12, 2015

(65) Prior Publication Data

US 2016/0006274 A1 Jan. 7, 2016

(30) Foreign Application Priority Data

Jul. 2, 2014 (CN) .......................... 2014 1 0313219
Jul. 2, 2014 (CN) ..................... 2014 2 0364155 U

(51) Int. Cl.
*H02J 7/00* (2006.01)

(52) U.S. Cl.
CPC ..... *H02J 7/0063* (2013.01); *H02J 2007/0067* (2013.01)

(58) Field of Classification Search
CPC . Y02E 60/12; H02J 7/14; H02J 7/0068; H02J 7/0091; H01M 10/44; H01M 10/441; H01M 10/486; H01M 10/5004; H01M 10/443; H01M 1/32; Y02T 10/7005; Y02B 40/90; H03K 17/0822; H03K 2017/0806; H02H 5/044; H02H 3/085; H02H 9/025; H02H 3/087; H02H 5/042; H02H 9/026;

(Continued)

(56) References Cited

U.S. PATENT DOCUMENTS 3,928,792 A * 12/1975 Mullersman .......... H01M 2/348
                                                                320/154
4,631,468 A * 12/1986 Satoh ....................... H02J 7/34
                                                                307/66

(Continued)

OTHER PUBLICATIONS

Linear Technology; "USB Power Manager with Ideal Diode Controller and 3.95V Li-Ion Charger"; © 2011; 24 pgs.

(Continued)

*Primary Examiner* — Richard Isla
*Assistant Examiner* — Mohammed J Sharief
(74) *Attorney, Agent, or Firm* — Harness, Dickey & Pierce, P.L.C.; Anthony G. Fussner

(57) ABSTRACT

Disclosed are exemplary embodiments of controllers and methods for use in climate control systems. In an exemplary embodiment, a controller for use in a climate control system includes a charger for providing a charge current to a battery of the controller. The controller also includes a variable resistance for selectively limiting the charge current. A control is configured to monitor the charge current and a voltage of the battery. Based on the monitoring, the control varies the resistance to keep the monitored voltage in a range defined by (a) a top charge voltage less than full capacity of the battery and (b) a discharge end voltage greater than a cut-off voltage of the battery. The monitored voltage has a substantially minimized rate of change within the range.

20 Claims, 6 Drawing Sheets

(58) Field of Classification Search
CPC ........ H02H 3/025; G05F 1/573; H01C 7/027; H01C 1/1406
USPC ....... 320/162, 150, 152; 361/93.8, 93.9, 106
See application file for complete search history.

(56) References Cited

U.S. PATENT DOCUMENTS

| | | | | |
|---|---|---|---|---|
| 4,816,736 | A * | 3/1989 | Dougherty | H02J 7/1423 320/116 |
| 5,656,916 | A * | 8/1997 | Hotta | B60L 1/003 180/65.1 |
| 5,677,615 | A * | 10/1997 | Takano | G01R 19/16542 320/152 |
| 6,337,560 | B1 | 1/2002 | Kalogeropoulos et al. | |
| 6,339,526 | B1 * | 1/2002 | Aboyoussef | H02H 3/24 327/527 |
| 6,545,448 | B1 * | 4/2003 | Stanley | G01R 31/3679 320/132 |
| 2003/0137280 | A1 * | 7/2003 | Goodman | H02J 7/0031 320/136 |
| 2005/0156574 | A1 * | 7/2005 | Sato | H02H 7/18 320/134 |
| 2007/0151273 | A1 * | 7/2007 | Nelson | B60H 1/00421 62/236 |
| 2008/0164855 | A1 * | 7/2008 | Tam | G06F 1/263 323/233 |
| 2008/0278116 | A1 * | 11/2008 | Matsunaga | H01M 10/44 320/134 |
| 2009/0243549 | A1 | 10/2009 | Matsumura et al. | |
| 2010/0026243 | A1 * | 2/2010 | Tatsumi | H02J 7/1446 320/132 |
| 2010/0253285 | A1 * | 10/2010 | Takahashi | H02J 7/0006 320/118 |
| 2010/0320971 | A1 * | 12/2010 | Zhu | H02J 7/0042 320/134 |
| 2012/0126019 | A1 * | 5/2012 | Warren | G05D 23/1902 236/51 |
| 2012/0274268 | A1 * | 11/2012 | Ishida | H02J 3/14 320/107 |
| 2012/0306506 | A1 * | 12/2012 | Kiuchi | G01R 31/3658 324/434 |
| 2013/0249494 | A1 * | 9/2013 | Ju | H02J 7/0029 320/134 |
| 2014/0028267 | A1 * | 1/2014 | Lee | H02J 7/0052 320/152 |

OTHER PUBLICATIONS

Lyric; www.lyric.honeywell.com; Jun. 17, 2014; 4 pgs.
"Lithium Batteries and Cathode Materials", M. Stanley Whittingham, Chemical Reviews, 2004, vol. 104, No. 10, pp. 4271-4301; Published Sep. 14, 2004; 31 pgs.
MIC79110; www.micrel.com; Oct. 2007; 14 pgs.

* cited by examiner

US 10,536,017 B2

MANAGING CHARGE OF A BATTERY IN A CLIMATE CONTROL DEVICE TO PROLONG BATTERY LIFE

CROSS-REFERENCE TO RELATED APPLICATIONS

This application claims the benefit and priority of Chinese Patent of Invention Application No. 201410313219.7 filed Jul. 2, 2014, and Chinese Utility Model Application No. 201420364155.9 filed Jul. 2, 2014. The entire disclosures of the above applications are incorporated herein by reference.

FIELD

The present disclosure relates to apparatus, systems and methods for managing battery charge to prolong battery life for a climate control system controller.

BACKGROUND

This section provides background information related to the present disclosure which is not necessarily prior art.

Digital thermostats and other climate control system controllers typically have microcomputers and other components that continuously use electrical power. In various thermostats, such components may obtain at least some of their operating power from batteries.

SUMMARY

This section provides a general summary of the disclosure, and is not a comprehensive disclosure of its full scope or all of its features.

According to various aspects, exemplary embodiments are disclosed of controllers and related methods for use in climate control systems. In an exemplary embodiment, a controller for use in a climate control system generally includes a charger for providing a charge current to a battery of the controller. The controller also includes a variable resistance for selectively limiting the charge current. A control is configured to monitor the charge current and a voltage of the battery. Based on the monitoring, the control varies the resistance to keep the monitored voltage in a range defined by (a) a top charge voltage less than full capacity of the battery and (b) a discharge end voltage greater than a cut-off voltage of the battery. The monitored voltage has a substantially minimized rate of change within the range.

Also disclosed is a method of managing charge of a battery of a controller for use in a climate control system. The method is performed by a control of the controller and generally includes monitoring a charge current provided by a charger to the battery. The method also includes monitoring a voltage of the battery. Based on the monitoring, the rate of change of the monitored voltage is substantially minimized by varying a resistance to limit the monitored charge current. The varying is performed to keep the monitored voltage in a range defined by (a) a top charge voltage less than full capacity of the battery and (b) a discharge end voltage greater than a cut-off voltage of the battery.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventor hereof has recognized that rechargeable lithium-ion batteries have a limited number of recharge cycles, beyond which the batteries can no longer be recharged. The number of recharge cycles for various batteries typically does not exceed 500 cycles. The inventor has observed that battery life can be increased when a battery is charged by a trickle current to a voltage that is less than the maximum voltage to which the battery might be charged, and where the battery is maintained at or near the lesser voltage, e.g., for as long as possible.

Accordingly, the inventor has developed and discloses herein exemplary embodiments of apparatus and methods by which the rate of charging and ultimate voltage level of a lithium battery may be controlled. In some embodiments, a resistor bank and a microprocessor may be used to control the charging rate and voltage level of a battery to extend the life of the battery. In one example embodiment, a battery of a thermostat or other controller may be charged to an initial voltage level less than the battery's maximum capacity voltage, then discharged, e.g., by 20 to 30 percent, to a charge level above the battery's minimum allowable (i.e., cut-off) voltage, and then trickle-charged back to the initial voltage level. In some example embodiments, the trickle charge current may be adjusted and set, e.g., as a function of load currently "seen" by the thermostat or other controller receiving power from the battery. In various embodiments, a charging circuit may be provided in conjunction with a power stealing circuit, e.g., a current-limited power stealing circuit of a thermostat or other climate control system controller. Although various embodiments are described with reference to rechargeable batteries that might not be replaceable, it should be understood that various aspects of the disclosure are applicable relative to batteries that are replaceable.

In various embodiments, a method and circuit design are provided for a power stealing circuit and a rechargeable lithium battery and in which the voltage level and power draw on the battery are monitored. In response to the monitoring, one or more loads are turned off, and an appropriate charging voltage value is selected by a microprocessor. The charging voltage determines the amount of current provided to the battery and is designed to maximize the useful life of the battery. In addition, if the monitored battery voltage falls below a certain value, one or more large current consuming loads (e.g., a Wi-Fi radio) are turned off, and the power stealing circuit provides power to the battery. In various embodiments, the power stealing circuit is a current-limited power stealing circuit.

Figure 1:
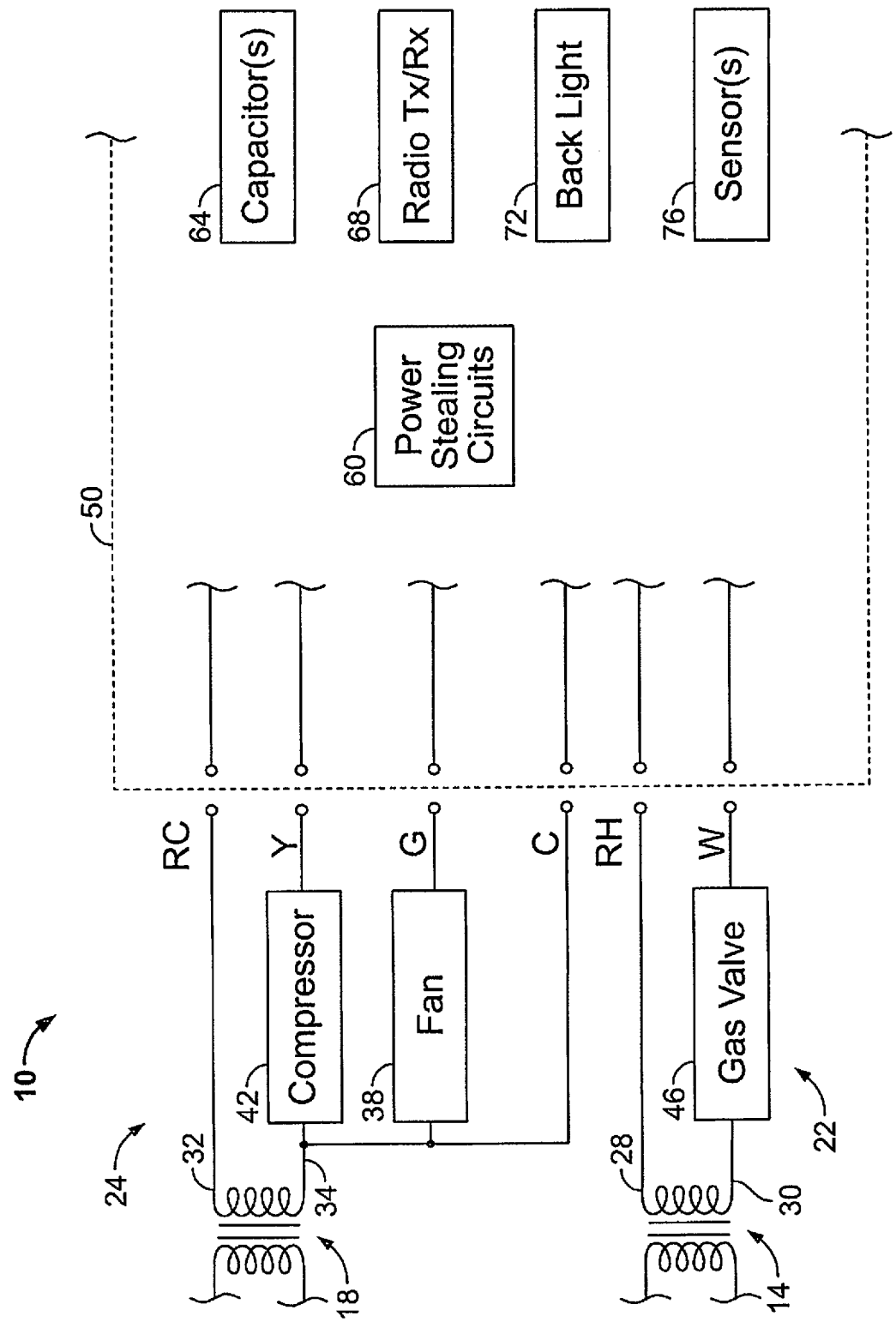
FIG. 1 is a diagram of an exemplary climate control system including a thermostat in accordance with an exemplary embodiment of the present disclosure.

With reference now to the figures, FIG. 1 illustrates an exemplary climate control system 10 including a controller embodying one or more aspects of the present disclosure. As shown in FIG. 1, the climate control system 10 includes two power sources, e.g., two transformers 14 and 18 for providing power respectively to a heating subsystem 22 and a cooling subsystem 24. The heating subsystem transformer 14 has a hot (typically 24-volt) side 28 and a common, i.e., neutral, side 30. The cooling subsystem transformer 18 has a hot (typically 24-volt) side 32 and a common, i.e., neutral, side 34. The cooling subsystem 24 includes a fan 38 and a compressor 42 connected on the common side 34 of the transformer 18. The heating subsystem 22 includes a furnace gas valve 46 connected on the common side 30 of the heating subsystem transformer 14. In the present example, a C terminal is provided from a common C wire connected, e.g., with the common side 34 of the transformer 18. However, in various alternative embodiments of the disclosure a C wire terminal is not made available.

In one example embodiment, a controller, e.g., a thermostat 50, is provided for controlling operation of the climate control system 10. The example thermostat 50 includes a power stealing circuit 60 that may obtain power from the transformers 14 and/or 18 for the thermostat 50. Stolen power may be used for powering one or more components of the thermostat 50. Stolen power also may be stored in one or more optional capacitors 64 and/or may be used, e.g., to power circuit(s) ancillary to the thermostat 50, including but not limited to a radio transceiver 68 for wireless communication, a back light 72, and/or one or more sensors 76. In various embodiments, power from a battery (not shown in FIG. 1) is provided in the event, e.g., that stolen power is not available.

It should be noted generally that thermostat and/or other controller embodiments and/or power stealing circuit embodiments in accordance with various aspects of the disclosure could be installed in other types of climate control systems, including but not limited to systems having a single transformer, heat-only systems, cool-only systems, heat pump systems, etc. In some embodiments, a C terminal may be provided, e.g., from the common side 30 of the transformer 14. In some other embodiments, a thermostat or other controller may not be provided with a connection to a common C wire. Further, although the climate control system 10 shown in FIG. 1 provides single-stage heat and single-stage cooling, in various embodiments a thermostat or other controller may be provided in a climate control system having multiple stages of heating and/or cooling.

Figure 2:
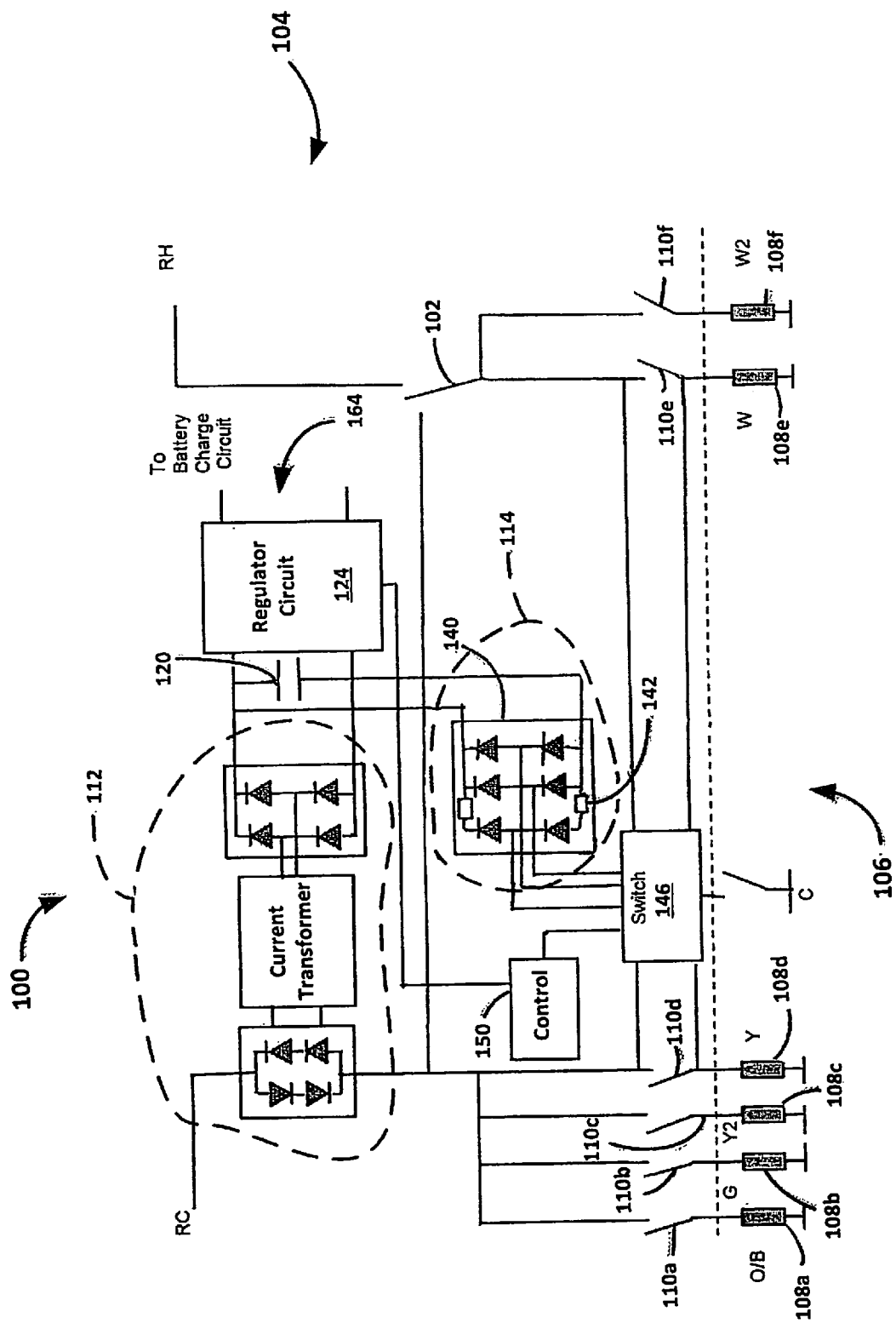
FIG. 2 is a diagram of an exemplary power stealing circuit in accordance with an exemplary embodiment of the present disclosure.

An example embodiment of a power stealing circuit is indicated in FIG. 2 by reference number 100. The power stealing circuit 100 may be adapted for use in a thermostat for any one of a plurality of climate control system types, e.g., systems having a single transformer, two-transformer systems, heat-only systems, cool-only systems, heat pump systems, etc. In various embodiments, and as further described below, the power stealing circuit 100 may be configured to steal power through one or more climate control system loads. Stolen power may be transferred from one or more climate control system "hot" wires along one or more paths to produce a DC output voltage, e.g., for operating a radio transceiver and/or other thermostat components. In various embodiments, the power stealing circuit 100 may steal power through a load that is in an "off" mode and/or through another load that is in an "on" mode.

In the present example embodiment the power stealing circuit 100 is configured in a thermostat 104 of an example climate control system 106. In the present example embodiment a switch 102, e.g., a jumper, a relay, transistor-based switch, manually operable switch, etc., is selectively operable to connect the power stealing circuit 100 with a transformer hot wire RC or RH of the climate control system 106. The climate control system 106 is configured with loads 108a-108f (referred to generally as loads 108.) Two furnace heating stages 108e and 108f may be powered through wires W and W2. Two cooling stages 108c and 108d may be powered through wires Y2 and Y. A fan 108b may be powered through a wire G and a heat pump reversing valve 108a may be powered through a wire O/B. Thermostat relays 110a-110f are selectively operable to switch one or more of the loads 108 into or out of operation in the climate control system 106.

In the present example embodiment, the power stealing circuit 100 may steal power through one or more of the loads 108. In various embodiments, the power stealing circuit 100 is configured to steal power from a load 108 that is in an "off" mode. Additionally or alternatively, in some example embodiments power could be stolen from a load that is in an "on" mode. The example power stealing circuit 100 includes an "on-mode" stealing circuit 112 and an "off-mode" stealing circuit 114. The circuits 112 and 114 are each connected across a capacitor 120 and with a regulator circuit 124, e.g., a buck circuit. The capacitor 120 may be, e.g., a 4000 uF capacitor. Capacities and configurations of components used in power stealing circuits may vary, e.g., based on the climate control system configuration in which a power stealing circuit is used, amount of power to be stolen and/or stored, etc. In various embodiments, an "on-mode" power stealing circuit could be used instead of or in addition to an "off-mode" power stealing circuit to provide power to a battery.

With continued reference to FIG. 2, the "off-mode" stealing circuit 114 of the power stealing circuit 100 includes a rectifier circuit 140, e.g., a full-wave bridge rectifier. The rectifier circuit 140 includes a current limit circuit or constant current regulator circuit 142. As further described below, in various embodiments the regulator circuit 124 provides power stolen in "off-mode" to a battery charge circuit for charging a rechargeable battery of the thermostat 104. In some embodiments the current limit circuit or constant current regulator circuit 142 may provide a current of 10 mA. Such current may be regulated and/or limited, e.g., so as to avoid unintended switching of a climate control system load from the "off" mode to the "on" mode.

The rectifier circuit 140 is connected with a switch 146 controlled by a control 150, e.g., a microprocessor. In the present example embodiment, the control 150 is a processor control unit (MCU) of the thermostat 104. The control 150 may be made, e.g., by Texas Instruments Inc., or by Freescale Semiconductor, Inc., etc. Thus the control 150 includes a processor and memory configured to control thermostat functions, e.g., calls for heat or cooling in response to user input to the thermostat 104. The control 150 detects the voltage of the capacitor 120. If the voltage is high enough, the control 150 may control the regulator circuit 124 to output a voltage 164, e.g., to a battery charge circuit as further described below. Otherwise the control 150 does not start the regulator circuit 124. The regulator circuit 124 may include, e.g., an inductor and capacitor for alternately storing and outputting energy.

It should be understood generally that other or additional components could be used in place of or in addition to various components described herein. For example, in some embodiments, one or more half-wave rectifiers could be used in place of one or more full-wave rectifiers. Additionally or alternatively, other or additional types of regulator circuits could be used, e.g., other or additional converter circuits, boost circuits, integrated circuits, etc. Still further, it should be understood that the power stealing circuit 100 is an example only. Various types of "off-mode" and/or "on-mode" power stealing circuits could be used in various embodiments. Additionally or alternatively, embodiments are possible in which power stealing is performed only occasionally or not at all, e.g., where power is provided through a C wire connection. There are numerous ways in which a thermostat or other controller could be configured to provide for recharging a battery in accordance with various aspects of the disclosure and as further described below.

The control 150 may detect operation of a load 108 that is in the "on" mode. The control 150 may subsequently determine which load 108 is in the "off" mode and connect the "off-mode" stealing circuit 114 with the "off-mode" load 108, so that power may be stolen from the "off-mode" load 108. For example, if the user has selected cooling, then the control 150 can select a heating circuit, e.g., through the load 108e and W circuit, from which to steal power. In such event, the control 150 can control the switch 146 to select the W circuit. Specifically, the relay 110d is closed and thus the first cooling stage load 108d is in an "on" mode. The first cooling stage load 108d may receive power, e.g., through the "hot" wire RC where the switch 102 is connected with the wire RC. The control 150 detects that the first cooling stage load 108d is in the "on" mode. In response the control 150 may operate the switch 146 to connect the "off-mode" stealing circuit 114 with an "off-mode" load, e.g., the first heating stage load 108e. "Off-mode" power stealing then may be performed along a path from the "off-mode" first heating stage load 108e through the open relay 110e and rectified by the rectifier circuit 140. The rectified signal may be filtered and stored by the capacitor 120.

Conversely, if a user has selected heating on the thermostat 104, then the control 150 can select a cooling circuit, e.g., through the load 108d and Y circuit, from which to steal power. In such event, the control 150 can control the switch 146 to select the Y circuit. If the user has selected an "auto" thermostat setting, then the control 150 can dynamically select an "off-mode" load as the loads are switched, e.g., from heat to cooling and vice versa. It should be noted that in the present example power stealing circuit 100, power stealing may be performed in various ways and from various "off" and/or "on" loads 108.

In various climate control systems in which a common C wire is provided, power may be provided from a climate control system transformer without having to steal power from a load. In the example embodiment of FIG. 2, a C wire of the climate control system 106 is present but is not connected with the thermostat 104. In the absence of a C wire connection, the thermostat 104 uses current stolen from the load(s) 108 for charging a battery as described below. In some embodiments the C wire may be connected with the power stealing circuit 100, e.g., through the switch 146 to provide power to the regulator circuit 124. The control 150 manages power stealing and manages the provision of power to the thermostat 104 through the capacitor 120 and regulator circuit 124. For example, the control 150 may control operation of the regulator circuit 124 based on a voltage level available from the capacitor 120, e.g., so that the regulator circuit 124 may provide a substantially continuous output voltage 164.

Figure 3:
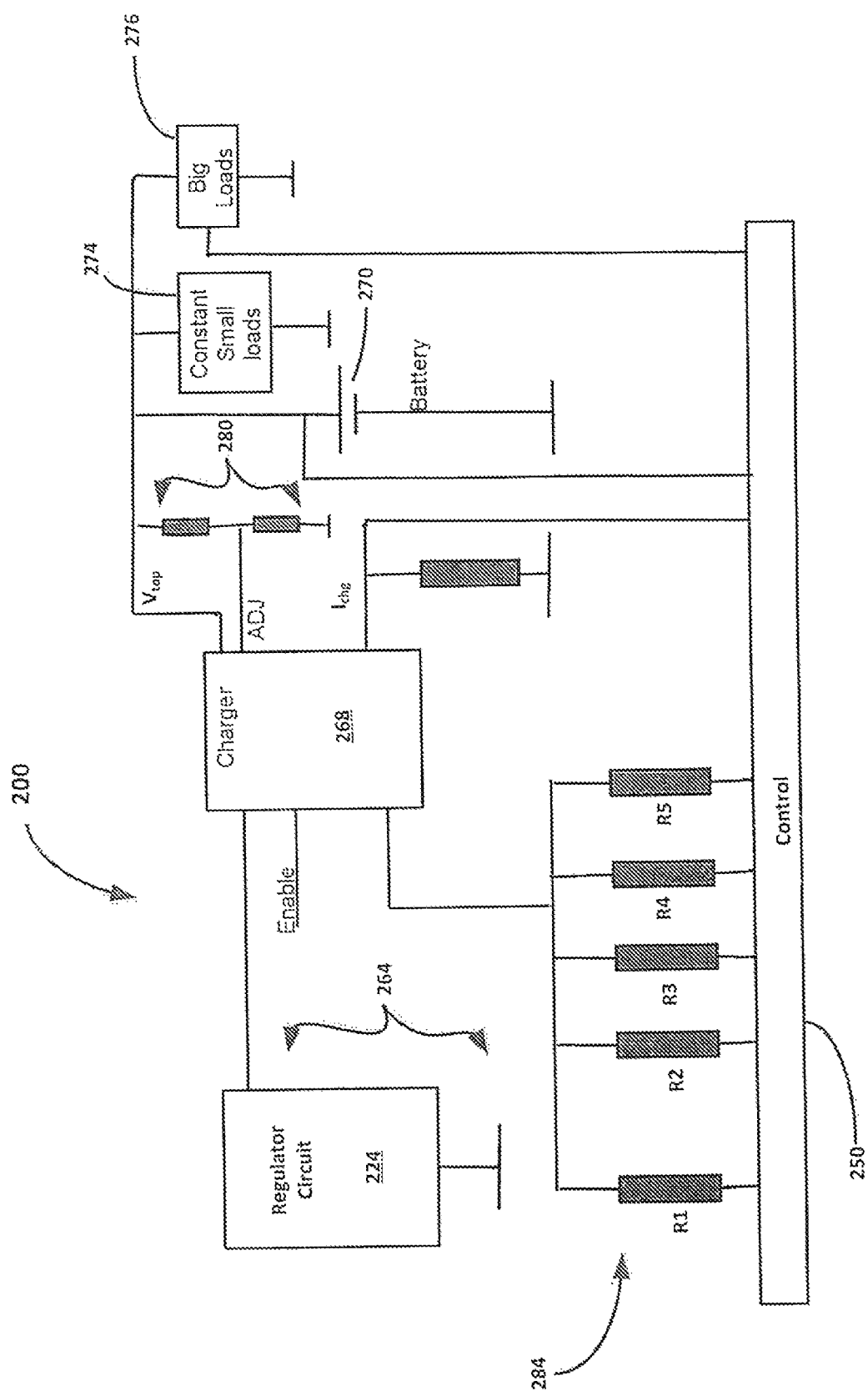
FIG. 3 is a diagram of an exemplary charging circuit in accordance with an exemplary embodiment of the present disclosure.

In various embodiments a controller may be configured to recharge a battery of the controller so as to prolong the useful life of the battery. In some embodiments, power may be stolen, e.g., as described with reference to FIG. 2, and provided to a charging circuit for recharging a controller battery. One example embodiment of a charging circuit that may be provided in a controller is indicated generally in FIG. 3 by reference number 200. The charging circuit 200 is provided in a thermostat and includes a regulator circuit 224, which in some embodiments may be provided in a power stealing circuit, e.g., as previously described with reference to the regulator circuit 124 of FIG. 2. In various embodiments the regulator circuit 224 may provide a voltage output 264, e.g., of between about 8 volts and about 12 volts to a charger 268, which may be an integrated circuit (IC). One example IC is a MIC79110BML charger, manufactured by Micrel, Inc. The charger 268 provides charge current to a battery 270 of the thermostat. The battery 270 may be, e.g., a rechargeable lithium-ion battery. The battery 270 provides power to one or more small loads 274 and/or large loads 276 of the thermostat. Small loads 274 such as sensor sampling, clock timekeeping, etc. tend to be substantially constant. Larger current-consuming thermostat loads 276 may be in an "on" mode, e.g., when the thermostat performs communication, e.g., wirelessly via Wi-Fi radio and/or using a color display screen. Other or additional small and/or large loads may be provided in various controller embodiments.

The charging circuit 200 includes a control 250, e.g., a microprocessor, which in some embodiments may be a microprocessor control unit (MCU) of a thermostat, e.g., as previously described with reference to the control 150 of FIG. 2. The control 250 controls operation of one or more large loads 276. In some embodiments, the control 250 may additionally or alternatively control operation of other or additional load(s) 274 and/or 276.

The control 250 is configured to control operation of the charger 268. In the present example embodiment, the charger 268 may use a variable resistance 280 to establish a top charge voltage $V_{top}$ to which the battery 270 may be charged. In various embodiments the top charge voltage $V_{top}$ is less than the full voltage capacity of the battery 270. The control 250 also controls a variable resistance, e.g., a resistor network 284 including parallel resistors R1-R5 (referred to generally as Rn). The resistors Rn are selected, e.g., by a manufacturer for inclusion in the charging circuit 200 based, e.g., on the capability of the battery 270. In some other embodiments, a charging circuit may be provided with a battery having a capacity greater or less than that of the battery 270. Accordingly, a resistor network or other variable resistance incorporated in such a charging circuit may be configured to provide resistance values different from those of the resistor network 284. As further described below, the control 250 may vary the resistance of the resistor network 284 to selectively limit a charge current $I_{chg}$ provided by the charger 268 to the battery 270.

In various embodiments, during thermostat operation the control 250 monitors the charge current $I_{chg}$. The control 250 also monitors the voltage of the battery 270, which may change as power is drawn, e.g., by the load(s) 274 and/or 276. Based on the monitoring, the control 250 may vary the resistance of the resistance network 284 to keep the voltage of the battery 270, e.g., within a defined voltage range as the battery 270 is charged and/or discharged. The voltage range may be defined, e.g., by the top charge voltage $V_{top}$ and by a discharge end voltage $V_{low}$ established, e.g., by the control 250. In various embodiments the discharge end voltage $V_{low}$ is greater than a cut-off voltage of the battery 270, i.e., a voltage at which an "empty" state of the battery 270 is defined. In various embodiments the voltage of the battery 270 has a substantially minimized rate of change within the defined voltage range.

In one example embodiment the battery 270 has a top charge voltage $V_{top}$ of 3.92V and a discharge end voltage $V_{low}$ of 3.74V, as determined from characteristics of the example battery 270 as shall now be described. Table 1 lists voltages of the battery 270 that correspond to percentages of capacity of the battery 270. In one example embodiment, the battery 270 is a 600 milliamp-hour, Li/CoO$_2$ battery having a package similar to that of a cell phone battery. Battery composition, size, capacity and/or package, etc. may differ in other embodiments.

TABLE 1

| Capacity | Voltage (Volt) |
| --- | --- |
| 100% | 4.20 |
| 90% | 4.06 |
| 80% | 3.98 |
| 70% | 3.92 |
| 60% | 3.87 |
| 50% | 3.82 |
| 40% | 3.79 |
| 30% | 3.77 |
| 20% | 3.74 |
| 10% | 3.68 |
| 5% | 3.45 |
| 0% | 3.00 |

As shown in Table 1, discharge of the battery 270 from about 4.2V to about 3.9V, and from about 3.7V to about 3.0V, is quick in comparison to discharge of the battery 270 from about 3.9V to about 3.7V. The rate of battery discharge tends to be lowest at or near a platform voltage $V_{plat}$, which for the present example battery is about 3.8V. In the present example embodiment, setting the top charge voltage $V_{top}$ to 3.92V establishes a top charge at 70 percent of battery capability, and setting the discharge end voltage $V_{low}$ to 3.74V results in discharge being halted at 20 percent of battery capability. When the float voltage of the example battery 270 is reduced, e.g., by between 100 mV and 300 mV, the expected life cycle of the battery 270 can be increased by 2 to 5 times. When the battery 270 is discharged lightly, e.g., by 20 to 30 percent, and is then trickle-charged back to, e.g., 3.9V, the life cycle of the battery 270 can be increased by 5 to 10 times. The inventor has observed that although a lithium ion battery might have an expected life of 500 recharge cycles, the expected life of 500 cycles is typically observed when batteries are mostly discharged, then rapidly charged to their maximum voltages.

Further, in the example charging circuit 200, the control 250 varies the resistance of the resistor network 284 to limit the charge current $I_{chg}$ to trickle levels, e.g., between about 8 mA and about 64 mA. When charge current is limited to a trickle current, the charge current can serve to prolong a battery life cycle. Such currents can be provided through power stealing, e.g., as described with reference to FIG. 2. In the present example embodiment, the resistors Rn have the following values:

R1=1 KΩ
R2=3.125 KΩ
R3=6.25 KΩ
R4=12.5 KΩ
R5=25 KΩ

The resistor network 284 may be used to limit charge current, e.g., as shown in Table 2.

TABLE 2

| 1K | 3.125K | 6.25K | 12.5K | 25K | Current (mA) |
| --- | --- | --- | --- | --- | --- |
| 0 | Floating | Floating | Floating | Floating | 200 |
| Floating | Floating | Floating | Floating | 0 | 8 |
| Floating | Floating | Floating | 0 | Floating | 16 |
| Floating | Floating | Floating | 0 | 0 | 24 |
| Floating | Floating | 0 | Floating | Floating | 32 |
| Floating | Floating | 0 | Floating | 0 | 40 |
| Floating | Floating | 0 | 0 | Floating | 48 |
| Floating | Floating | 0 | 0 | 0 | 56 |
| Floating | 0 | Floating | Floating | Floating | 64 |
| Floating | 0 | Floating | Floating | 0 | 72 |

As shown in Table 2, when, e.g., the 1 KΩ resistor R1 alone is switched into the resistor network 284 and the resistors R2-R5 are floating, i.e., not connected in the resistor network 284, the charge current $I_{chg}$ may be limited to 200 mA. When the 25 KΩ resistor R5 alone is switched into the network 284, the charge current $I_{chg}$ may be limited to 8 mA. When the 12.5 KΩ resistor R4 alone is switched into the network 284, the charge current $I_{chg}$ may be limited to 16 mA. When the resistors R4 and R5 are switched together into the network 284, the charge current $I_{chg}$ may be limited to 24 mA. When the 6.25 KΩ resistor R3 alone is switched into the network 284, the charge current $I_{chg}$ may be limited to 32 mA, etc.

Figure 4:
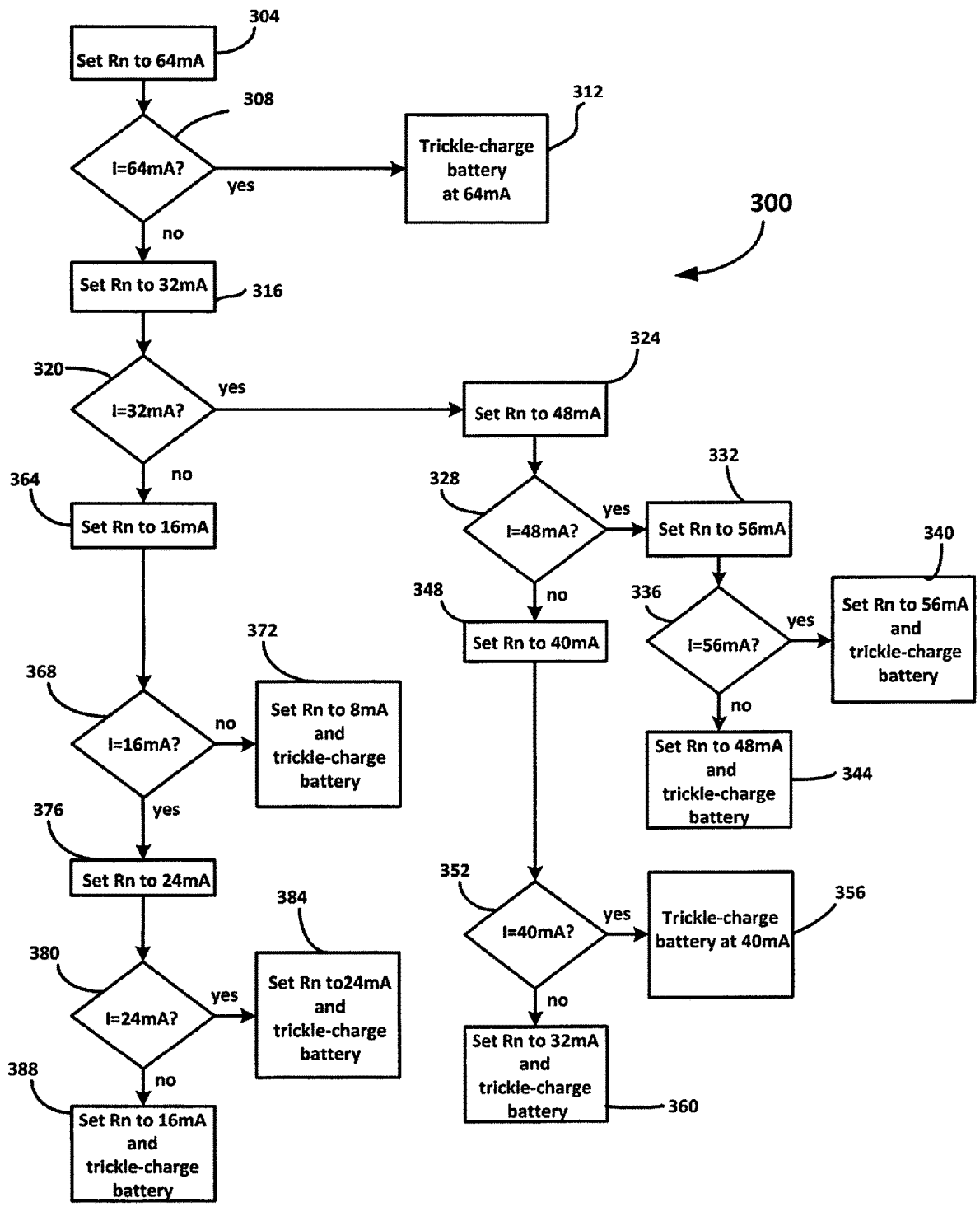
FIG. 4 is a flow diagram of an exemplary method of maximizing trickle current in accordance with an exemplary embodiment of the present disclosure.

In various embodiments, the control 250 also varies the resistance of the resistor network 284 so as to maximize the charge current $I_{chg}$ while selectively limiting it to a trickle current. A flow diagram of one embodiment of a method of maximizing trickle current is indicated generally in FIG. 4 by reference number 300. It should be noted that the method 300 is only an example, and that various ways of evaluating charge current and applying resistance(s) could be used to maximize the charge current within trickle levels in accordance with various embodiments of the disclosure. It also should be noted that specific values for current, voltage, resistance, etc. referred to in FIG. 4 and elsewhere in the disclosure are examples only. Specific values could be different for various battery capacities, types of batteries, power stealing systems, chargers, loads, climate control systems, etc.

In process 304 the resistor network 284 is set to limit charge current $I_{chg}$ to 64 mA. In process 308 it is determined whether the charge current $I_{chg}$ is 64 mA. If yes, then in process 312 the battery 270 is trickle-charged by the current $I_{chg}$, which is limited to 64 mA. If it is determined in process 308 that $I_{chg}$ is less than 64 mA, then in process 316 the resistor network 284 is set to limit the charge current $I_{chg}$ to 32 mA. If in process 320 it is determined that the charge current $I_{chg}$ is 32 mA, then in process 324 the resistor network 284 is set to allow an increase of the charge current $I_{chg}$ to 48 mA. In process 328 it is determined whether the charge current $I_{chg}$ increased to 48 mA. If yes, then in process 332 the resistor network 284 is set to allow an increase of the charge current $I_{chg}$ to 56 mA. In process 336 it is determined whether the charge current $I_{chg}$ increased to 56 mA. If yes, then in process 340 the resistor network 284 is set to limit the charge current $I_{chg}$ to 56 mA and the battery 270 is trickle-charged by the current $I_{chg}$ at 56 mA. If in process 336 the charge current $I_{chg}$ is determined to be less than 56 mA, then in process 344 the resistor network 284 is set to limit the charge current $I_{chg}$ to 48 mA and the battery 270 is trickle-charged by the current $I_{chg}$ at 48 mA.

If in process 328 it is determined that the charge current $I_{chg}$ is less than 48 mA, then in process 348 the resistor network 284 is set to limit the charge current $I_{chg}$ to 40 mA. If in process 352 it is determined that the charge current $I_{chg}$ is 40 mA, then in process 356 the battery 270 is trickle-charged by the 40 mA current $I_{chg}$. If in process 352 it is determined that the charge current $I_{chg}$ is less than 40 mA, then in process 360 the resistor network 284 is set to limit the charge current $I_{chg}$ to 32 mA and the battery 270 is trickle-charged by the charge current $I_{chg}$ at 32 mA. If in process 320 it was determined that the charge current $I_{chg}$ is less than 32 mA, then in process 364 the resistor network 284 is set to limit the charge current $I_{chg}$ to 16 mA, and processes 368-388 are performed to determine an appropriate resistance value for Rn to limit the charge current $I_{chg}$ to a value of 24 mA, 16 mA, or 8 mA.

The example method 300 may be performed to find a resistance value that minimally limits the charge current $I_{chg}$ to the battery 270 in relation to current that might then be available to the charging circuit 200, e.g., from a power stealing circuit, and also in relation to power that load(s) of the thermostat might then be consuming. The method 300 maximizes charge current within limits that keep the current $I_{chg}$ at trickle levels appropriate for prolonging battery life. In various embodiments the example method 300 may be repeated, e.g., periodically and/or as prompted by various changing conditions during operation of the controller, to maximize the trickle charge current $I_{chg}$ as voltage across the battery 270 rises and falls with various load(s) 274 and/or 276. In various embodiments a trickle charge current $I_{chg}$ may be provided at substantially constant levels, dependent at least in part on which if any large load(s) 276 are in the "on" mode. In the present example embodiment, trickle current from the charger 268 is sent directly to the battery 270. Power obtained from power stealing and use of trickle charge currents may range, e.g., from about 30 mW to about 300 mW.

In some embodiments, batteries having relatively large capacities may be used so that battery life may be prolonged. Where, e.g., a battery having a 600 mA capacity is charged to 70 percent capacity and discharged to 20 percent capacity, half of its capability, i.e., 300 mAH, is used. Where, e.g., a more costly but longer-lived battery having a 1000 mA capacity is charged to 50 percent capacity and discharged to 20 percent capacity, 30 percent of its capability, i.e., 300 mAH, is used.

Figure 5:
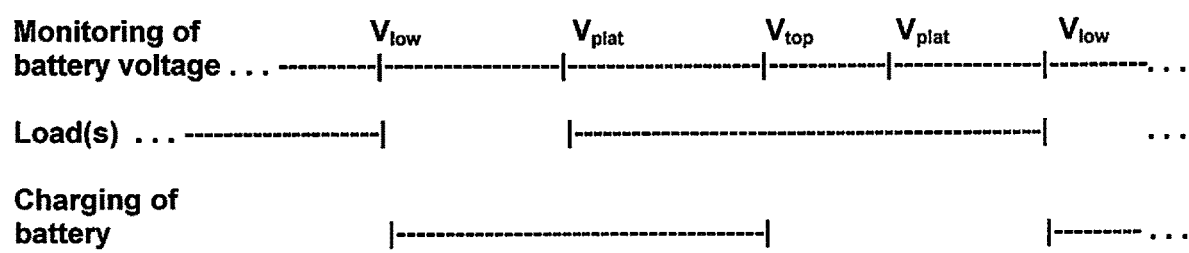
FIG. 5 is a diagram of exemplary operation sequences in accordance with an exemplary embodiment of the present disclosure.

In various embodiments the control 250 may control battery charging, e.g., as shown in FIG. 5. The control 250 monitors voltage on the battery 270 as the voltage increases from $V_{low}$ to $V_{plat}$ to $V_{top}$ and decreases from $V_{top}$ to $V_{plat}$ to $V_{low}$. When battery voltage has decreased to $V_{low}$ there can still be power available for operation of small load(s) 274. However, in some embodiments the control 250 shuts off large load(s) 276 and signals the charger 268 to begin charging the battery 270. Additionally or alternatively, the control 250 may begin running in a low power mode. The number and/or size(s) of load(s) that are shut off may vary dependent, e.g., on the level of current that may be available, e.g., from a power stealing circuit. In various embodiments, all large loads may be shut off, e.g., where power-stolen current tends to be small.

Figure 6:
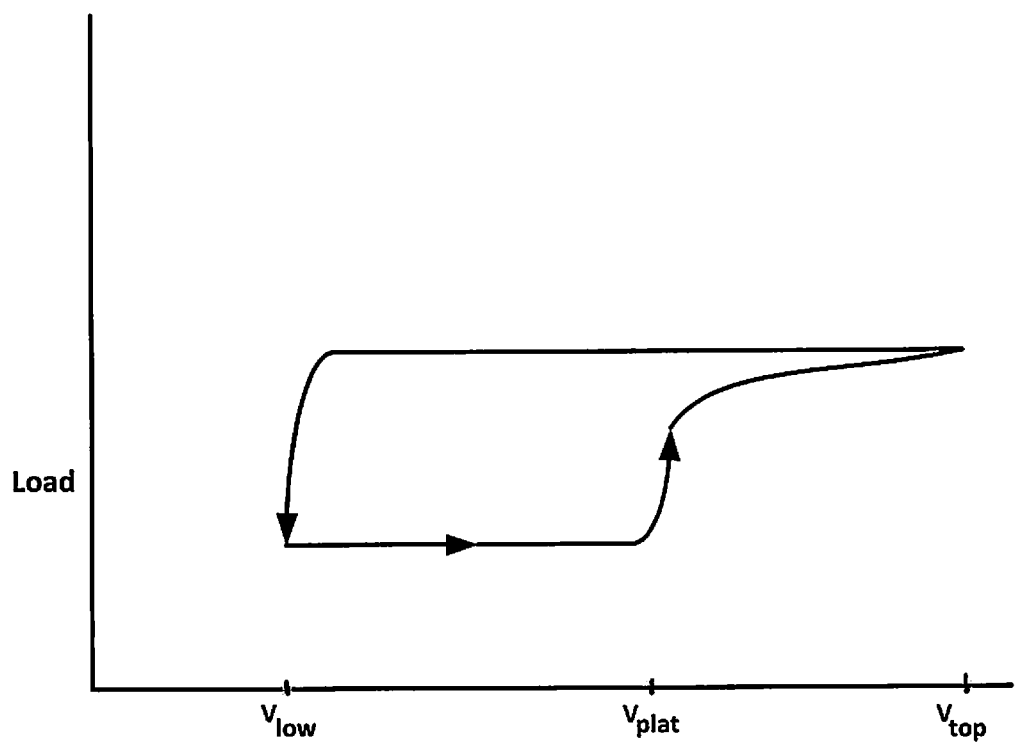
FIG. 6 is a diagram of an exemplary hysteresis loop in accordance with an exemplary embodiment of the present disclosure.

When the battery voltage reaches $V_{plat}$ the control 250 may switch one or more of the large loads 276 to the "on" mode as the charging of the battery 270 continues. When the battery voltage reaches $V_{top}$ the charger 268 stops charging the battery 270. Operation of the load(s) 276 continues until the battery voltage again has decreased to $V_{low}$. The control 250 again shuts off one or more large loads 276 and signals the charger 268 to begin charging the battery 270, and so on. As a large load is switched on and off, a hysteresis loop occurs, e.g., as shown in FIG. 6. It should be understood that FIGS. 5 and 6 are examples only, and that other or additional operation sequences and/or hysteresis loops are possible in relation to various types of batteries, power stealing systems, chargers, loads, climate control systems, etc.

In various embodiments a connection to a C wire may be available for connection with a controller such as a thermostat. In such case and in various embodiments, energy can be provided for substantially all thermostat loads from the C wire 24 VAC supply. Although a battery may be provided on such a thermostat, the battery might not be used much, if at all. The thermostat battery may provide current, e.g., when there is a loss of AC power. Where, for example, the C wire of FIG. 2 is switched into the power stealing circuit 100, the control 250 may determine, based on the monitored charge current $I_{chg}$, that the C wire is connected in the power stealing circuit 100. Accordingly the control 250 may vary the resistor network 284 so that the charge current $I_{chg}$ has a value, for example, of one-fifth of the battery capacity. For example, where a battery has a capacity of 600 mAH, the charge current $I_{chg}$ may be 120 mA, and where a battery has a capacity of 1000 mAH, the charge current $I_{chg}$ may be 200 mA. The control 250 may set the resistors Rn, e.g., by using only the resistor R1 in the resistor network 284, to provide a constant charge current $I_{chg}$ of 200 mA.

In some embodiments, the control 250 may monitor voltage of, e.g., a thermostat battery and use the monitored voltage to determine whether the battery is approaching the end of its serviceable life. Such determination may be signaled to a user of the thermostat so that, e.g., user may replace the battery. The determination may, e.g., be displayed as an icon on a display of the thermostat and/or (where the thermostat is wireless-enabled) sent to the user's smart phone or other mobile device, e.g., via a mobile application ("app") for energy management.

The foregoing apparatus, systems and methods make it possible to provide a thermostat with power sufficient to operate large loads such as a wireless transceiver or other wireless module, color screen, etc., and the lifetime of a lithium ion battery can be prolonged.

Thus, exemplary embodiments or implementations are disclosed of a controller for use in a climate control system, the controller comprising a charger for providing a charge current to a battery of the controller; a variable resistance for selectively limiting the charge current; and a control configured to: monitor the charge current and a voltage of the battery; and based on the monitoring, vary the resistance to keep the monitored voltage in a range defined by (a) a top charge voltage less than full capacity of the battery and (b) a discharge end voltage greater than a cut-off voltage of the battery. The monitored voltage has a substantially minimized rate of change within the range.

Exemplary embodiments or implementations also are disclosed of a method of managing charge of a battery of a controller for use in a climate control system. The method is performed by a control of the controller. The method includes monitoring a charge current provided by a charger to the battery; monitoring a voltage of the battery; and based on the monitoring, substantially minimizing the rate of change of the monitored voltage by varying a resistance to limit the monitored charge current. The varying is performed to keep the monitored voltage in a range defined by (a) a top charge voltage less than full capacity of the battery and (b) a discharge end voltage greater than a cut-off voltage of the battery.

In the foregoing controller or method, the resistance may be varied to maximize the charge current while selectively limiting the charge current.

In the foregoing controller or method, power may be stolen through a load of the climate control system and provided to the charger.

In the foregoing controller or method, based on the monitored voltage of the battery, a load of the controller may be switched to an off mode to increase the charge current.

In the foregoing controller or method, the controller may include a thermostat.

In the foregoing controller or method, the battery may be replaceable.

In the foregoing controller or method, a battery replacement alert may be displayed on the controller and/or a mobile device.

In the foregoing controller or method, a level of the charging current may be based at least in part on loading of the controller.

In the foregoing controller or method, a common wire of the climate control system may be used to provide power to the charger.

In the foregoing controller or method, the monitored voltage may be used to determine whether the battery is approaching the end of battery life.

In the foregoing controller or method, a load of the controller may be switched to an on mode when the monitored voltage substantially equals a platform voltage at which the rate of change of the monitored voltage is minimized.

In the foregoing controller or method, the charge current may be a trickle current.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller for use in a climate control system, the controller comprising:
    a charger for providing a charge current to a battery of the controller in the climate control system;
    a resistor network for selectively limiting the charge current, the resistor network input to the charger; and
    a microprocessor configured to:
        monitor the charge current and a voltage of the battery; and
        based on the monitoring, select individual resistors of the resistor network to vary a resistance of the resistor network to selectively limit the charge current to the battery to keep the monitored voltage in a range established by the microprocessor to minimize a rate of change of voltage of the battery, the range defined by (a) a top charge voltage less than full capacity of the battery and (b) a discharge end voltage greater than a cut-off voltage of the battery; the monitored voltage having a substantially minimized rate of change within the established range.

2. The controller of claim 1, wherein the microprocessor is configured to select individual resistors of the resistor network to vary the resistance of the resistor network to maximize the charge current while selectively limiting the charge current.

3. The controller of claim 1, wherein the microprocessor is configured to, based on the monitored voltage of the battery, switch a load of the controller to an off mode to increase the charge current.

4. The controller of claim 1, wherein:
    a common wire of the climate control system is used to provide power to the charger.

5. The controller of claim 1, wherein a load of the controller is switched to an on mode when the monitored voltage substantially equals a platform voltage at which the rate of change of the monitored voltage is minimized.

6. The controller of claim 1, wherein the controller comprises a thermostat.

7. The controller of claim 1, wherein:
    the battery is replaceable; and/or
    a battery replacement alert is displayed on the controller and/or a mobile device.

8. The controller of claim 1, configured to steal power through a load of the climate control system and provide the stolen power to the charger.

9. The controller of claim 1, configured to use the monitored voltage to determine whether the battery is approaching the end of battery life.

10. The controller of claim 1, wherein the charge current is a trickle current.

11. The controller of claim 1, wherein a level of the charging current is based at least in part on loading of the controller.

12. The controller of claim 1, wherein the resistor network is connected between the microprocessor and the charger, wherein each individual resistor of the resistor network is connected to an individual port of the microprocessor.

13. A method of managing charge of a battery of a controller for use in a climate control system, the method comprising:
    establishing a range in which to maintain voltage on the battery so that rate of change of the voltage during use of the battery are substantially minimized;
    monitoring a charge current provided by a charger to the battery;
    monitoring the voltage of the battery; and
    based on the monitoring, substantially minimizing the rate of change of the monitored voltage by selecting individual resistors of a resistor network input to the charger to vary a resistance of the resistor network to selectively limit the monitored charge current, the selecting performed to keep the monitored voltage in the range, the range being defined by (a) a top charge voltage less than full capacity of the battery and (b) a discharge end voltage greater than a cut-off voltage of the battery;
    the method performed by a microprocessor of the controller in the climate control system.

14. The method of claim 13, wherein:
    the resistance is varied to maximize the charge current while selectively limiting the charge current; and/or
    power is stolen through a load of the climate control system and provided to the charger.

15. The method of claim 13, wherein based on the monitored voltage of the battery, a load of the controller is switched, by the controller, to an off mode to increase the charge current.

16. The method of claim 13, wherein a common wire of the climate control system is used to provide power to the charger.

17. The method of claim 13, wherein a load of the controller is switched to an on mode when the monitored voltage substantially equals a platform voltage at which the rate of change of the monitored voltage is minimized.

18. The method of claim 13, wherein the controller comprises a thermostat.

19. The method of claim 13, wherein the battery is replaceable; wherein the monitored voltage is used to determine whether the battery is approaching the end of battery life; and wherein the method further comprises displaying a battery replacement alert on the controller and/or a mobile device.

20. The method of claim 13, wherein the charge current is a trickle current.

* * * * *